Feb. 13, 1934.　　　A. J. MEYER　　　1,947,215
ENGINE
Original Filed Feb. 6, 1932
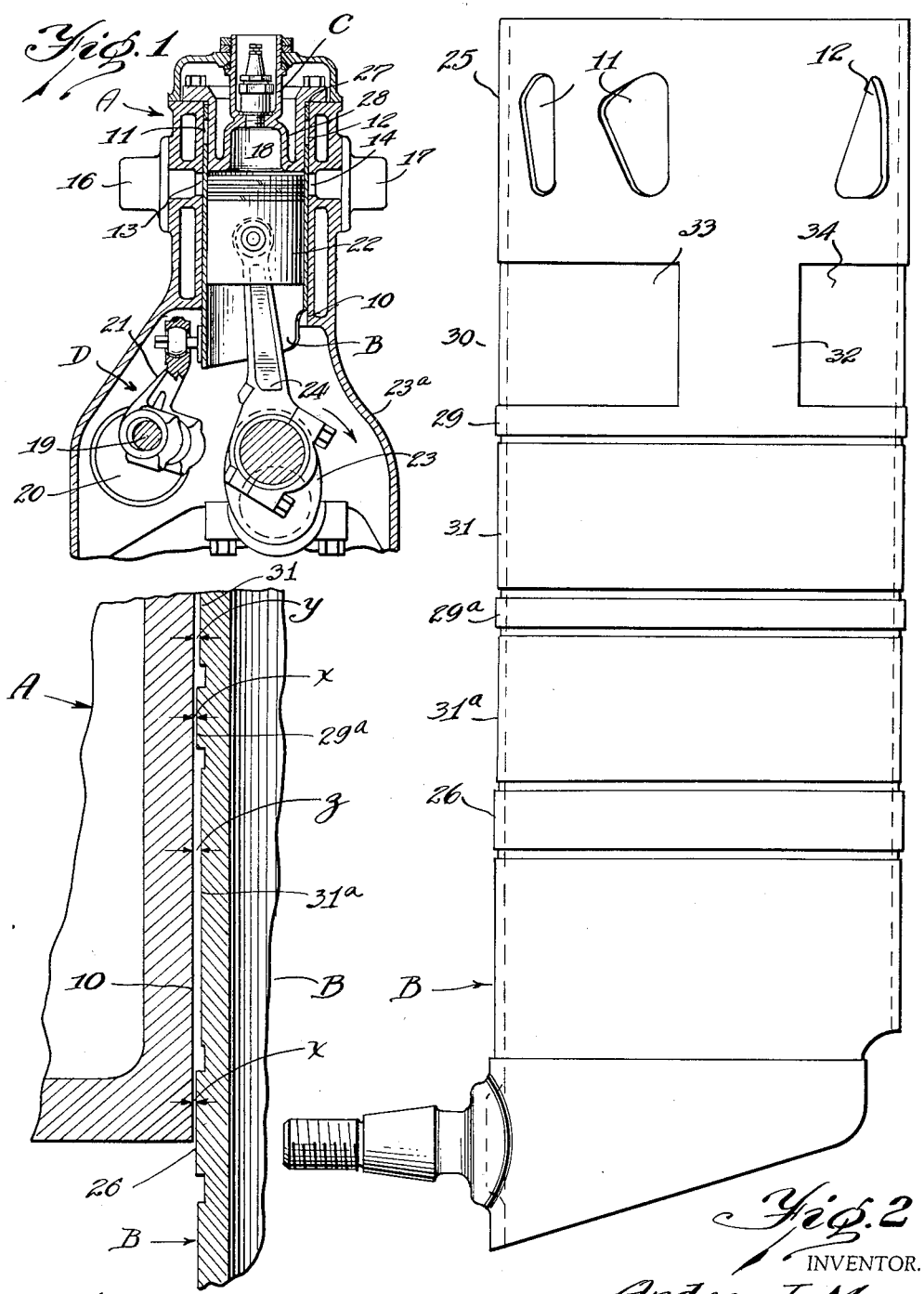
INVENTOR.
Andre J. Meyer
BY
W. W. Harris
ATTORNEY.

Patented Feb. 13, 1934

1,947,215

UNITED STATES PATENT OFFICE 1,947,215

ENGINE

Andre J. Meyer, Detroit, Mich., assignor to Continental Motors Corporation, Detroit, Mich., a corporation of Virginia Application February 6, 1932, Serial No. 591,251
Renewed July 27, 1932

21 Claims. (Cl. 123—196)

My invention relates to internal combustion engines and refers more particularly to the sleeve valve types of engines as distinguished from poppet valve engines. More specifically my invention provides improved methods and constructions relating to the Burt-McCollum type of single sleeve valve engine in which the sleeve is given a combined axial reciprocation and oscillation in accomplishing the porting and other cycles of the engine performance, but I desire it understood that my improvements are for the most part equally adaptable to other types of engines than the single sleeve type as will be more apparent from my disclosure. The teachings of my invention may also be utilized in connection with elements other than sleeves, adapted for reciprocation in cylindrical structures.

Heretofore considerable difficulty has been experienced in fitting the sleeve valve or valves to the parts associated therewith, usually within the cylinder, to maintain a gas seal sufficient to permit relatively high explosion pressures without attendant friction losses. In other words, when the sleeve is fitted relatively tight or close (such as .0015 inches clearance with the cylinder for example) to maintain the desired seal for the development of high pressures and to prevent excessive oil pumping and carbonizing in the combustion chamber, then under such conditions the resulting friction due to the tight fit over the sleeve length increases the friction loss in the engine often to the point where it negatives the advantages derived from the tight fit. On the other hand when the sleeve is fitted relatively loosely (such as .004 clearance with the cylinder for example) the power developed by the engine increases, owing to the reduced friction loss but such increase is offset by gas pressure loss during explosion and by the attendant disadvantages of oil pumping past the sleeve with carbonization in the combustion chamber.

In reference to the single sleeve engine of the aforesaid combined movement type I have discovered that the sleeve tends to bear against the cylinder principally in the vicinity of the cylinder ports (where such zone is subjected to the peak explosion pressures) and near the bottom of the cylinder. The sleeve with customary valving for the engine described is ordinarily oscillating at the top of its stroke during the peak pressure development and such pressure tends to expand the sleeve at the cylinder port zone, the sleeve bearing principally at such times at said zone and at a second zone adjacent the bottom of the cylinder, this being emphasized with a wobble type drive such as illustrated herein.

I have dealt with these problems and claimed inventions relating thereto in my co-pending applications Ser. No. 550,064, filed July 11, 1931 and Ser. No. 566,927 filed October 5, 1931 whereby I am enabled to retain the tight gas seal at the cylinder ports with attendant increased engine power and without carbonization in the combustion chamber and at the same time to minimize the friction losses so as to actually realize the aforesaid advantages in the net performance of the engine. I accomplish this specifically by providing a clearance between the sleeve and cylinder at the zone of sleeve exposure to peak pressures whereby friction losses at this point are minimized, the sleeve being provided with spaced bands of a diameter sufficient to tightly engage the cylinder, whereby the sleeve friction is localized to provide relatively high pressure intensity thereby reducing the coefficient of friction and the total friction loss. At the same time the sleeve is given a clearance with the cylinder at the zone of maximum gas pressure whereby usual friction losses experienced by sleeve expansion under such pressure is eliminated.

Difficulty has been experienced with the employment of a sleeve valve of the type aforesaid in controlling the consumption of oil to the full desired extent when the engine is operating at relatively high speed under load. In other words, while my aforesaid applications provide for great improvements, I have now discovered further improvements especially directed to the problems of lubrication and oil consumption particularly in connection with my improved type of sleeve valve as described and claimed in said applications.

The aforesaid clearance zones collect lubricating oil and maintain the desired oil film between the sleeve valve and cylinder, which minimizes wear and friction and also transfers heat to the cylinder walls. Hence I have discovered that it is important to maintain the oil film in the clearance zone or zones in the vicinity of the combustion chamber but that it is not so important to maintain such film at the inner portion of the sleeve and cylinder contact, viz. the portion of the sleeve operating in the vicinity of the inner cylinder end. This inner end of the cylinder is directly open to the usual crankcase containing the lubricating oil supply and is therefore abundantly supplied with oil. I have discovered that by breaking down the inner or lower oil film between the sleeve and cylinder, I am enabled to greatly minimize the quantity of oil supplied outwardly of the sleeve and into the combustion chamber, and at the same time maintain the oil film in the vicinity of the combustion chamber. This oil film at the inner sleeve clearance zone may be broken down in various ways but I prefer to accomplish this oil supply regulation by increasing the clearance space between the sleeve and cylinder at said clearance zone with respect to the clearance zone of maintained oil film. I have discovered that substantially .001 of an inch additional clearance will satisfactorily break down this oil film, and additional clearance does not materially affect the oil controlling characteristics. Thus under such conditions my tests show very much less oil consumption with the engine operating under conditions of greatest oil consumption tendencies.

Further advantages of my invention will be apparent as this specification progresses, reference being made for illustration, to the accompanying drawing showing one embodiment of my invention, and in which:

Fig. 1 is a sectional elevation view of a typical engine cylinder for a representative sleeve valve engine, Fig. 2 is an elevation view of the sleeve valve enlarged to illustrate my invention, and Fig. 3 is an enlarged detail view of the inner cylinder end and associated sleeve valve portion.

In the drawing reference character A represents an engine and for purposes of illustration this engine is shown as the Burt-McCollum type as aforesaid, the sleeve valve B moving in cylinder 10 to cause intake ports 11 and exhaust ports 12 thereof to perform the usual valving functions with cylinder intake and exhaust ports 13 and 14 respectively. Intake and exhaust manifolds 16, 17 respectively communicate with the cylinder ports 13, 14. The cylinder is closed by the usual cylinder head assembly C of the re-entrant type providing the combustion chamber 18. The sleeve is moved by a suitable driving mechanism D illustrated as a wobble crank 19 carried by the valveshaft 20 driven at half engine crankshaft speed for the usual four stroke cycle, the wobble crank 19 being connected to the sleeve by the sleeve link 21. Within the sleeve B is located the usual piston 22 operating crankshaft 23 by the connecting rod 24. The inner end or bottom of cylinder 10 is open to the crankcase 23ª adapted to contain the usual supply of lubricating oil. The lower end of sleeve B extends into the crank case. Oil vapors and oily mist accumulate on the sleeve and cylinder and the oil tends to work upwardly of the sleeve and cylinder.

Referring particularly to Fig. 2 it will be noted that the sleeve B has a band 25 forming a bearing portion and extending circumferentially around the sleeve preferably containing the sleeve intake and exhaust ports 13, 14, this band extending axially of the sleeve sufficiently beyond the ports to provide sufficient gas seal therefor, as for example ¼ of an inch below the ports in the illustration. The sleeve is provided with another bearing portion 26 spaced axially below the bearing portion 25, said portions 25 and 26 being generally referred to as upper and lower or outer and inner cylinder bearing portions, Preferably this lower bearing portion is of less longitudinal width than the upper bearing portion and is arranged preferably for operation in the vicinity of the lower or inner portion of the engine cylinder while the upper bearing portion is arranged for operation preferably in the vicinity of the cylinder ports and in the sleeve pocket 27 above the ports formed by the re-entrant portion 28 of the cylinder head C. A third bearing portion 29 is located between the upper and lower bearing portions, this intermediate upper or intermediate outer bearing portion being spaced axially from the upper and lower bearing portions and preferably arranged so as to lie just below the cylinder ports when the sleeve is in its uppermost position of travel. Preferably the bearing portion 29 is spaced from the bearing portion 25 a distance substantially the same or slightly less than the vertical travel of the sleeve so as to only slightly overlap that portion of the cylinder engaged by the bearing portion 25. I have also provided a fourth bearing portion 29ª spaced axially between the bearing portions 26 and 29, this bearing 29ª being referred to as the intermediate lower or intermediate inner bearing. The sleeve portions intermediate the axially spaced bearing portions are of less diameter than the bearing portions to provide clearance between the sleeve and cylinder. Thus I provide cylinder clearance portions or zones 30, 31 and 31ª. The clearance 31ª is greater than the clearances 30 and 31.

As an illustration of typical sleeve and cylinder fits which I have found adaptable for accomplishing the objects of my invention, I may fit zones 25, 26, 29 and 29ª within cylinder 10 with .002 of an inch clearance and even less, the remaining portions of the sleeve preferably being free from contact with the cylinder. In this manner much of the friction losses of the engine may be eliminated to produce useful delivered horsepower output. It will be observed that in Fig. 1 with the crankshaft moving clockwise as indicated by the arrow the expansion or combustion cycle is approximately just commencing and the intake gases being compressed for firing. The piston 22 is approximately located at or near top or outer dead center and the band or zone 25 is projected upwardly in the sleeve pocket whereby the sleeve portion 30 will be positioned opposite the cylinder ports 13, 14. Thus, the peak pressures developed by the combustion in chamber 18 act outwardly within the sleeve at portions thereof having sufficient clearance with the cylinder to prevent friction losses between the sleeve and cylinder during explosion. Furthermore, by reason of the bearing sleeve zones 25, 26, 29 and 29ª being a relatively small proportion of the total sleeve area the friction loss due to sleeve movement is greatly reduced and the sleeve bearing provided where it will act most efficiently. By reason of my invention I am enabled to provide unusually close fits between the cylinder and sleeve at the sleeve ports in order to realize an efficient gas seal with improved power output and greatly reduced oil pumping and carbonization in the combustion chamber.

By way of illustration I have formed zones 25, 29, 29ª, and 26 with .0005 of an inch clearance indicated at X with the cylinder, where the cylinder bore is about 3.5 inches in diameter, and approximately .002 of an inch clearance indicated at Y for the zones 30 and 31. The clearance for the latter zones should not exceed approximately .002 of an inch since substantially this amount is necessary to maintain a film of oil of ordinary quality between the cylinder and the walls of zones 30 and 31. The zone 31ª is provided with a clearance indicated at Z greater than clearance Y by approximately .001 of an inch and exaggerated in Fig. 3 for clarity. Thus the outside diameter of zone 31ª is approximately .002 of an inch less than the outside diameter of zones 30 and 31. This will maintain an adequate film of oil of ordinary quality between the cylinder and the walls of zones 30 and 31 for adequate lubrication and heat transfer to the cylinder. The zone 31ª of smaller clearance or less diameter than zones 30 and 31 has its oil film broken down but at the same time will deliver an adequate quantity of oil to maintain the oil films for zones 30 and 31. I have thus provided an oil consumption control at the lower or inner portion of cylinder whereby oil travel upwardly or outwardly is materially reduced and still ample lubrication maintained.

I have provided means preventing passage of exhaust gases from the exhaust manifold to the intake manifold when the recessed portion 30 of the sleeve, which provides clearance between the sleeve and cylinder, is located in the vicinity of the cylinder intake and exhaust ports. This is preferably accomplished as described and claimed in my aforesaid application Ser. No. 566,927 by providing vertical land portions 32 one of which is shown in Fig. 2, extending parallel to the sleeve axis and connecting the sleeve bearing portions 25 and 29, said connecting land portions preferably constructed flush with the outer bearing surface of said bearing portions. Thus, the land portions or strips 32 divide the sleeve clearance portion 30 between the bearing portions 25 and 29 into non-communicating segmental recesses or zones 33 and 34 which are thus spaced circumferentially of the sleeve by the land portions 32 and adapted to respectively communicate with the cylinder intake and exhaust ports 13 and 14, when said clearance portion is located in the vicinity of said cylinder ports as shown in Fig. 1. Such lands 32 do not form a part of this application per se.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In an engine, a tubular sleeve valve adapted for movement in a cylinder of the engine, said sleeve having a plurality of longitudinally spaced cylinder bearing portions with intermediate clearance portions of less diameter than that of said bearing portions, one of said clearance portions being constructed to control oil travel outwardly of the sleeve.

2. In an engine, a tubular sleeve valve adapted for movement in a cylinder of the engine, said sleeve having a plurality of longitudinally spaced cylinder bearing portions with intermediate clearance portions of less diameter than that of said bearing portions, one of said clearance portions being adapted to maintain an oil film with the cylinder, and another of said clearance portions being adapted to prevent an oil film forming with the cylinder whereby to control oil travel to the first said clearance portion.

3. In an engine, a tubular sleeve valve adapted for movement in a cylinder of the engine, said sleeve having a plurality of longitudinally spaced cylinder bearing portions with intermediate clearance portions of less diameter than that of said bearing portions, one of said clearance portions having a diameter less than another whereby to regulate oil travel thereto.

4. In an engine, a tubular sleeve valve adapted for movement in a cylinder of the engine, said sleeve having a plurality of longitudinally spaced cylinder bearing portions with intermediate clearance portions of less diameter than that of said bearing portions, one of said clearance portions having a diameter less than another whereby to regulate oil travel thereto, said first clearance portion being located outwardly of said sleeve and the last said clearance portion being located for movement in the vicinity of the inner end of the cylinder.

5. In an engine, a tubular sleeve valve adapted for axial movement in a cylinder of the engine, cylinder bearing bands spaced axially of the sleeve, annular cylinder clearance portions intermediate said bands, one of said clearance portions having a relatively greater clearance with the cylinder.

6. In an engine, a tubular sleeve valve adapted for axial movement in a cylinder of the engine, cylinder bearing bands spaced axially of the sleeve, annular cylinder clearance portions intermediate said bands, one of said clearance portions being located for movement adjacent the inner end of said cylinder, said last clearance portion having a relatively great clearance with the cylinder whereby to control oil passage outwardly of the cylinder.

7. In an engine, a tubular sleeve valve adapted for axial movement in a cylinder of the engine, cylinder bearing bands spaced axially of the sleeve, annular cylinder clearance portions intermediate said bands, one of said clearance portions being located for movement adjacent the inner end of said cylinder, said last clearance portion having a relatively great clearance with the cylinder whereby to control oil passage outwardly of the cylinder, another of said clearance portions being adapted to maintain an oil film with the cylinder.

8. In an engine, a cylinder, a sleeve valve operably associated with the cylinder, said sleeve having an oil film forming recess, and means spaced inwardly of said recess for controlling oil supply to said recess.

9. In an engine, a cylinder having an annular row of ports in its wall, a sleeve valve operably associated therewith and having ports adapted for cooperation with the cylinder ports, said sleeve having an oil film clearance zone with the cylinder adjacent and below said sleeve ports, said oil film clearance zone adapted to maintain an oil film with said cylinder, said sleeve having an oil controlling clearance zone spaced below said oil film clearance zone.

10. In an engine, a cylinder having an annular row of ports in its wall, a sleeve valve operably associated therewith and having ports adapted for cooperation with the cylinder ports, said sleeve having an oil film clearance zone with the cylinder adjacent and below said sleeve ports, said oil film clearance zone adapted to maintain an oil film with said cylinder, said sleeve having an oil controlling clearance zone spaced below said oil film clearance zone, said sleeve valve being adapted for combined axial reciprocation and oscillation in said cylinder.

11. In an engine, a cylinder having an annular row of ports in its wall, a sleeve valve operably associated therewith and having ports adapted for cooperation with the cylinder ports, said sleeve having an oil film clearance zone with the cylinder adjacent and below said sleeve ports, said oil film clearance zone adapted to maintain an oil film with said cylinder, said sleeve having an oil controlling clearance zone spaced below said oil film clearance zone, said oil controlling clearance zone being located for movement in the vicinity of the bottom of said cylinder.

12. In an engine, a cylinder having an annular row of ports in its wall, a sleeve valve operably associated therewith and having ports adapted for cooperation with the cylinder ports, said sleeve having an oil film clearance zone with the cylinder adjacent and below said sleeve ports, said oil film clearance zone adapted to maintain an oil film with said cylinder, said sleeve having an oil controlling clearance zone spaced below said oil film clearance zone, said oil controlling clearance zone having a relatively great clearance with the cylinder whereby to prevent formation of an oil film with the cylinder.

13. A sleeve valve of the combined movement type of the character described, said sleeve adapted for movement in a cylinder and having a first cylinder bearing zone outwardly thereof, said bearing zone having a plurality of ports, a second cylinder bearing zone spaced below said first zone to provide an oil film forming cylinder clearance portion therebetween, third and fourth cylinder bearing zones spaced below said second zone, said third and fourth zones being axially spaced to provide a cylinder clearance portion having a clearance sufficient to prevent formation of an oil film with the cylinder.

14. A sleeve valve of the combined movement type of the character described, said sleeve adapted for movement in a cylinder and having a first cylinder bearing zone outwardly thereof, said bearing zone having a plurality of ports, a second cylinder bearing zone spaced below said first zone to provide an oil film forming cylinder clearance portion therebetween, third and fourth cylinder bearing zones spaced below said second zone, said third and fourth zones being axially spaced to provide a cylinder clearance portion having a clearance sufficient to prevent formation of an oil film with the cylinder, and a cylinder bearing portion connecting said first and second cylinder bearing zones.

15. A sleeve valve of the combined movement type of the character described, said sleeve adapted for movement in a cylinder and having a first cylinder bearing zone outwardly thereof, said bearing zone having a plurality of ports, a second cylinder bearing zone spaced below said first zone to provide an oil film forming cylinder clearance portion therebetween, third and fourth cylinder bearing zones spaced below said second zone, said third and fourth zones being axially spaced to provide a cylinder clearance portion having a clearance sufficient to prevent formation of an oil film with the cylinder, said sleeve having a second oil film forming cylinder clearance portion intermediate said second and third cylinder bearing zones.

16. In an engine, a cylindrical element adapted for sliding movement in a cylinder of the engine, said element having a plurality of longitudinally spaced cylinder bearing portions with intermediate clearance portions of less diameter than that of said bearing portions, one of said clearance portions being constructed to control oil travel outwardly between said cylinder and said element.

17. In an engine, a cylinder, an element having a reciprocating movement within said cylinder, said element having a substantially cylindrical wall bearing in said cylinder, said wall being formed with a cylinder clearance portion extending circumferentially around said element, said clearance portion controlling oil travel outwardly of said wall between said cylinder and said element.

18. In an engine, a cylinder, an element having a reciprocating movement within said cylinder, said element having a substantially cylindrical wall bearing in said cylinder, said wall being formed with a cylinder clearance portion intermediate the length axially of said wall, said clearance portion being adapted to relieve the oil film pressure between said cylinder and said element whereby to control oil travel outwardly of said wall between said cylinder and said element.

19. In an engine, a tubular sleeve valve adapted for movement in a cylinder of the engine, said sleeve having a plurality of longitudinally spaced cylinder bearing portions with intermediate clearance portions of less diameter than that of said bearing portions, one of said clearance portions controlling oil travel outwardly of the sleeve, said sleeve having an extension below said oil controlling clearance portion, said extension projecting below said cylinder for single point sleeve actuation.

20. In an engine, a cylinder, an element having a reciprocating movement within said cylinder, said element having a substantially cylindrical wall bearing in said cylinder, said wall having a portion of clearance with said cylinder sufficient to relieve the oil film pressure therebetween and thereby control oil travel outwardly of said wall between said cylinder and said element.

21. In an engine, a cylinder, an element having movement within said cylinder, said element having a substantially cylindrical wall bearing in said cylinder, said wall having a portion of clearance with said cylinder sufficient to relieve the oil film pressure therebetween and thereby control oil travel outwardly of said wall between said cylinder and said element.

ANDRE J. MEYER.